United States Patent [19]

Eer Nisse

[11] Patent Number: 4,660,420
[45] Date of Patent: Apr. 28, 1987

[54] AT-CUT CRYSTAL RESONATOR PRESSURE TRANSDUCER

[75] Inventor: Errol P. Eer Nisse, Salt Lake City, Utah

[73] Assignee: Quartztronics, Inc.

[21] Appl. No.: 757,262

[22] Filed: Jul. 22, 1985

Related U.S. Application Data

[63] Continuation-in-part of Ser. No. 555,822, Nov. 28, 1983, Pat. No. 4,550,610.

[51] Int. Cl.$^4$ .......................... G01L 9/08; H01V 7/00
[52] U.S. Cl. ...................................... 73/702; 310/338
[58] Field of Search ................ 73/702, 703, 40.5 A, 73/151, 32 A, 115; 310/338, 344

[56] References Cited

U.S. PATENT DOCUMENTS 4,550,610 11/1985 Eer Nisse .............................. 73/702

*Primary Examiner*—Donald O. Woodiel
*Attorney, Agent, or Firm*—Thorpe, North & Western

[57] ABSTRACT

An AT-cut quartz resonator pressure transducer includes a generally disc-shaped resonator section, a housing surrounding the resonator section and joined to the perimeter thereof, with the walls of the housing extending in opposite directions generally normal to the plane of the resonator section. Selected portions of the sidewalls are made thinner than the remaining sidewall portions so that when the housing is immersed in a fluid, a non-uniform stress will be produced in the resonator section. The housing and resonator section are formed so that the frequency of vibration of the resonator section is substantially independent of temperature and relatively independent of temperature transients.

4 Claims, 9 Drawing Figures

AT-CUT CRYSTAL RESONATOR PRESSURE TRANSDUCER

BACKGROUND OF THE INVENTION

This is a continuation-in-part application of application, Ser. No. 555,822, filed Nov. 28, 1983, now U.S. Pat. No. 4,550,610.

This invention relates to an AT-cut crystal resonator used for measuring pressure in fluids.

It is necessary or desirable to measure pressure in a variety of physical environments. One of the most harsh environments in which pressure measurement is necessary is that of deep oil and gas wells. One of the present techniques used in measuring pressure in such environments involves the use of a quartz crystal transducer apparatus which includes a circular resonator section peripherally supported within a hollow, cylindrical housing formed as an integral part of the resonator section. See U.S. Pat. Nos. 3,617,780 and 3,561,832. The resonator section of such apparatus is caused to vibrate by oscillatory electrical signals applied to electrodes placed on the resonator section. The frequency of vibration of the resonator section varies with variation in radially directed stresses in the resonator section caused by pressure on the housing. Variation in the frequency of vibration of the resonator section thus affords a measure of the pressure to which the housing is subjected.

One of the problems in using apparatus such as that described above for measuring pressure is so-called thermal shock. This arises because the output frequency of the resonator shifts as a result of temperature changes, but more particularly as a result of rapid temperature change, referred to as temperature transients. When the apparatus is used to measure pressure in oil and gas wells, there can be significant temperature changes as the apparatus is lowered into and brought back up from the well or as the rate of flow of oil or gas changes, and since the change in frequency of vibration is used to measure the pressure, temperature-caused pressure errors occur. The temperature transient effects on the resonator section are caused by temperature gradients which produce radially directed stresses. These temperature gradients result from the flow of heat into both the resonator section housing (which is relatively large in the prior art) and into the resonator section (which is also relatively large) via the metal electrodes coating the surfaces of the section and also via the quartz.

Another problem with the presently used quartz resonator transducers is that the scale factor (frequency versus pressure slope) is also temperature dependent for almost all crystallographic orientations of quartz. In order to compensate for the temperature-induced errors, it is necessary to provide a temperature measurement which can be used to correct the frequency output. However, such temperature measurements must be taken some distance away from the location of the quartz resonator transducer, and so accurate temperature measurements at the location of the transducer are difficult.

It has been found that by appropriate orientation at the crystallographic axes of the quartz resonator transducer, in particular SC-cut quartz crystals, the output frequency of the transducer can be made temperature transient independent. In effect, the frequency of the quartz resonator is made independent and immune from uniform radially directed stresses caused by temperature gradients. However, in the process of eliminating the effects of temperature transients, the ability to measure uniform radially directed stresses caused by pressures on the transducer housing is also eliminated in prior art devices.

In U.S. Pat. No. 3,561,832, it is suggested that slots be selectively located between the periphery of the resonator section and the shell or housing—in effect, that the resonator section be held in place by tabs extending between the section and the housing. By using two axially displaced resonator sections held in place in this fashion, it is felt that the temperature-dependent properties of the sections can be cancelled out. However, using this configuration for measuring high pressures would result in high stress concentration at the tabs and possible cracking. Also, the configuration is more complicated in design and construction and this, in turn, would likely reduce reliability.

In U.S. Pat. No. 3,617,780, a transducer configuration is disclosed which eliminates some of the high pressure caused problems of the configuration of U.S. Pat. No. 3,561,832, but in the process, other problems such as temperature induced errors are introduced.

SUMMARY OF THE INVENTION

It is an object of the invention to provide a resonator pressure transducer capable of accurately measuring pressures in harsh environments.

It is also an object of the invention to provide such a transducer which is substantially independent of temperature effects over a broad range of temperatures.

It is a further object of the invention to provide such a transducer having a relatively large scale factor, i.e., whose frequency is more sensitive to pressure change.

It is another object of the invention to provide such a transducer whose turnover point (flat portion of curve of change of frequency vs. temperature) moves up in temperature as pressure increases—in typical oil and gas wells, higher pressures are associated with higher temperatures.

It is still another object of the invention to provide such a transducer which may be smaller in size, simple in design and construction, and relatively easy to manufacture.

The above and other objects of the invention are realized in a specific illustrative embodiment which includes a generally disc-shaped resonator section formed from an AT-cut quartz crystal, and a housing surrounding the resonator section and joined to the perimeter thereof. The housing has sidewalls which extend generally normal to the plane of the resonator section, with at least one selected portion of the sidewalls being thinner than the remaining portions so that when the housing is immersed in a fluid, a non-uniform radial stress is produced in the resonator section. The stress causes a change in the resonant frequency of the resonator section. The location and symmetry of the selected thinner wall sections of the housing determine the stress pattern in the resonator section. Use of the AT-cut crystal results in improved frequency vs. temperature characteristics over the range of temperatures of primary interest—downhole oil well temperatures. In particular, effect of temperature on the frequency of the crystal over the temperature range of interest is minimized with the AT-cut crystal so that a more accurate reading of pressure can be obtained. By appropriate placement of the thinner wall sections, the scale factor can be increased and, at the same time, the scale factor dependence on temperature can be reduced. Finally, for the AT-cut crystal, the turnover point (flat portion of curve of change of frequency vs. temperature) moves up in temperature as pressure increases. Thus, for the combination of higher pressures and higher temperatures found in typical oil and gas wells, the change in frequency with temperature change is minimized as desired.

Circuitry is provided for causing the resonator section to vibrate, where the frequency of vibration varies with variation in force applied to the housing sidewalls.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The resonator pressure transducer of the present invention uses a non-uniform shell or housing so that when it is immersed in a fluid, non-uniform stresses are produced in the resonator section. The crystallographic orientation of the resonator section is selected so that frequency changes caused by temperature changes are substantially reduced. Since the pressures to be measured will now produce non-uniform stresses in the resonator section, causing the frequency of vibration of the resonator section to change, the pressures can be measured.

Figure 1:
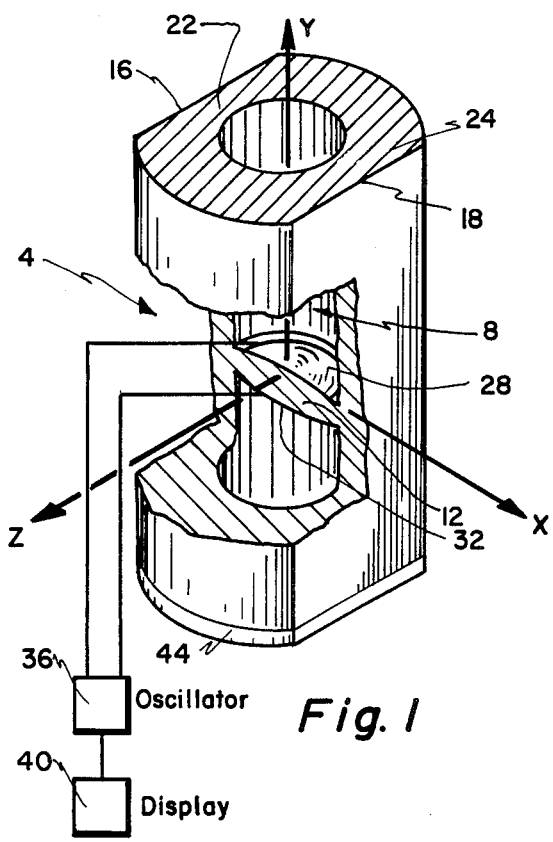
FIG. 1 shows a perspective, partially cut-away view of an AT-cut resonator pressure transducer made in accordance with the principles of the present invention.

FIG. 1 shows a perspective, partially cut-away view of a generally cylindrical housing 4 having a cylindrical cavity 8. Disposed in the cavity 8 and integrally formed at its perimeter with the sidewalls of the housing is a disc-shaped resonator section 12. The sidewalls of the housing 4 circumscribe the resonator section 12 and extend in opposite directions generally normal to the plane of the resonator section. Advantageously, the housing 4 and resonator section 12 are integrally formed from AT-cut quartz, in which case the y axis—normal to the resonator section—is in the AT-cut crystallographic orientation.

The exterior surface of the housing 4 is formed with two oppositely-facing flat sections 16 and 18 which result in two diametrically opposite portions 22 and 24 of the sidewalls being thinner than the remaining portions of the sidewalls. With this construction, when the housing 4 is immersed in a fluid, a non-uniform radial stress will be produced in the resonator section 12 because greater pressure will be transmitted through the thin sidewall portions 22 and 24 than through the remaining thicker portions. The axes of symmetry of the housing 4 are shown in FIG. 1, with the x axis being perpendicular to the flat sections 16 and 18.

Circuitry for causing the resonator section 12 to vibrate includes two electrodes 28 and 32 disposed (for example, by vacuum deposition) respectively on opposite surfaces of the resonator section, as shown in FIG. 1. The electrodes 28 and 32 are coupled to an oscillator 36 which produces an oscillatory signal for application to the electrodes to cause the resonator section 12 to vibrate in a well known manner. A display 40 is coupled to the oscillator to display the frequency of oscillation of the oscillator. As exterior pressure on the housing 4, and thus, on the resonator section 12, varies, the frequency of vibration of the resonator section changes and the oscillator 36 follows the frequency change to oscillate at the same frequency as the resonator section. Thus, changes in the frequency of vibration of the resonator section 12 can be detected and displayed to provide a measure of the pressure to which the housing 4 is subjected.

End caps, such as end cap 44, are placed at both ends of the housing 4 to seal the interior of the housing and prevent the entry of fluid whose pressure is being measured. Hereinafter, any reference to a "housing" shall be understood to mean an enclosed structure, such as that shown in FIG. 1 but including both end caps, capable of isolating the resonator section 12 from the exterior of the housing.

Figure 2:
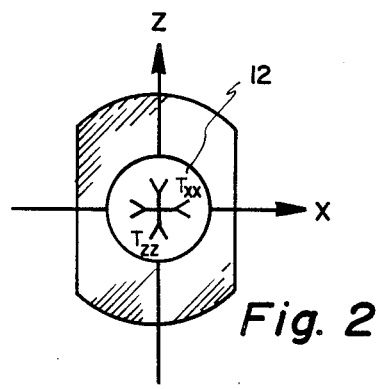
FIG. 2 is a graphic view illustrating the principal stresses in the resonator section of the transducer of FIG. 1 along the x and z axes of the section.

Use of an AT-cut crystal for the housing 4 and resonator section 12 (which facilitates construction of a relatively small device), employment of non-uniform stresses on the resonator section 12 by provision of the flat sections 16 and 18, and proper choice of the diametric alignment of the flat sections 16 and 18 relative to the crystallographic axes of the crystal all operate to provide a dramatic improvement in the pressure detecting capabilities of the device, especially in a high pressure, high temperature environment such as down hole in an oil or gas well. FIG. 2 is a graphic representation of the compressive stresses $T_{xx}$ along the x axis of the housing 4 and $T_{zz}$ along the z axis of the housing (compressive stress is taken to be negative). Since the x axis is perpendicular to the flat sections 16 and 18, a greater stress will be imposed on the resonator section 12 along the x axis via the thinner wall portions 22 and 24 and so $$T_{xx}/T_{zz} > 1.$$

The value of the ratio $T_{xx}/T_{zz}$ can be varied by changing the thickness of the thinner wall portions 22 and 24 relative to the thicker wall portions and also relative to the resonator thickness. For example, for a given difference in the thickness of the thinner and thicker wall portions, a thinner resonator section will give rise to a greater $T_{xx}/T_{zz}$ ratio. The stress representations $T_{xx}$ and $T_{zz}$ will be used again later on.

Figure 3:
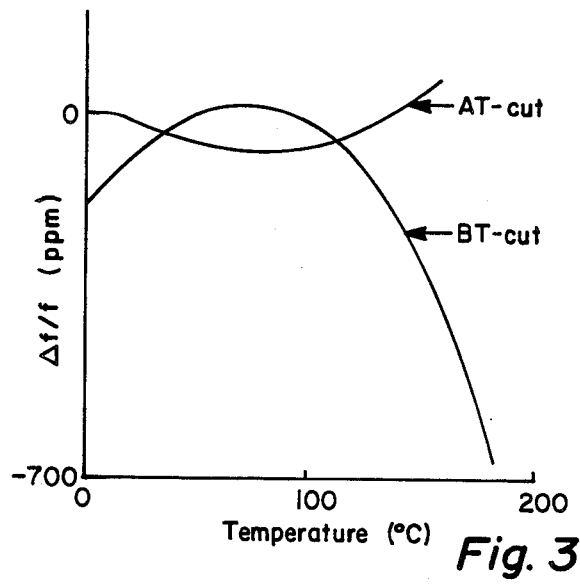
FIG. 3 is a graph showing the frequency temperature characteristics of AT-cut crystals and BT-cut crystals.

FIG. 3 shows the frequency-temperature characteristics of both AT-cut and BT-cut quartz crystal resonators. The curve for the BT-cut shows that the change of frequency of the crystal due to temperature change over a temperature range from 0° C. to about 200° C. is quite substantial, whereas the change of frequency due to temperature change for the AT-cut is much less over the same range of temperatures. Of course, this means that temperature introduced errors will be less for the AT-cut crystal, and such errors can be compensated for more readily.

The AT-cut crystal is generally easier to fabricate than the BT-cut because it is less sensitive to variations in the contour surfaces of the resonator section. Thus, it is easier to fabricate a smaller size AT-cut transducer which enables the transducer to reach thermal equilibrium more quickly in an operating environment, and yet still allows satisfactory performance in an oscillator circuit.

It has been found that for an AT-cut crystal resonator, the scale factor K (frequency vs. pressure slope) sensitivity can be improved by appropriate selection of the diameter alignment of the flat sections 16 and 18 relative to the crystallographic axes of the crystal. In order to explain this, the deviations $dT_{xx}$ and $dT_{zz}$ in stresses $T_{xx}$ and $T_{zz}$ (which would occur for a noncircular housing) will be modeled as perturbations on a resonator section with a circular housing. In such case, $$T_{xx} = dT_{xx} + T_{oo}, \text{ and} \qquad (1)$$

$$T_{zz} = dT_{zz} + T_{oo} \qquad (2)$$

where $$T_{xx} = T_{zz} = T_{oo} \text{ (for a circular housing)} \qquad (3)$$

It is known from general principles that $$T_{xx} + T_{zz} = 2T_{oo} \text{ (for circular and noncirclar housings)} \qquad (4)$$

which leads to $$dT_{zz} = -dT_{xx}. \qquad (5)$$

Since a diametrically opposed, inwardly directed, force pair F (inwardly directed force is taken to be positive) causes stresses at the disc center of $-6F/(\pi td)$ [along the direction of force application] and $2F/(\pi td)$ [perpendicular to the direction of force application], it is assumed that the $dT_{xx}$ and $dT_{zz}$ are adequately represented by two pairs of diametrically opposed forces acting along the x axis and z axis respectively—see FIG. 1 (t is the resonator section thickness and d is the resonator section diameter). Then, $$F_x = -\pi td(dT_{zz} + 3dT_{xx})/16 \qquad (6)$$

$$F_z = -\pi td(dT_{xx} + 3dT_{zz})/16. \qquad (7)$$

Both detailed finite element calculations and experiments using strain gauges on metal mockups give $T_{xx}$ and $T_{zz}$, not $dT_{xx}$ and $dT_{zz}$, so Eqs. 6 and 7 are rewritten in terms of $R = T_{xx}/T_{zz}$ (with the help of Eq. 4):

$$dT_{xx} = +(R-1)T_{oo}/(R+1) \qquad (8)$$

$$dT_{zz} = -(R-1)T_{oo}/(R+1). \qquad (9)$$

and $$F_x = -2\pi dt T_{oo}(R-1)/[16(R+1)] \qquad (10)$$

$$F_z = +2\pi dt T_{oo}(R-1)/[16(R+1)]. \qquad (11)$$

Figure 4:
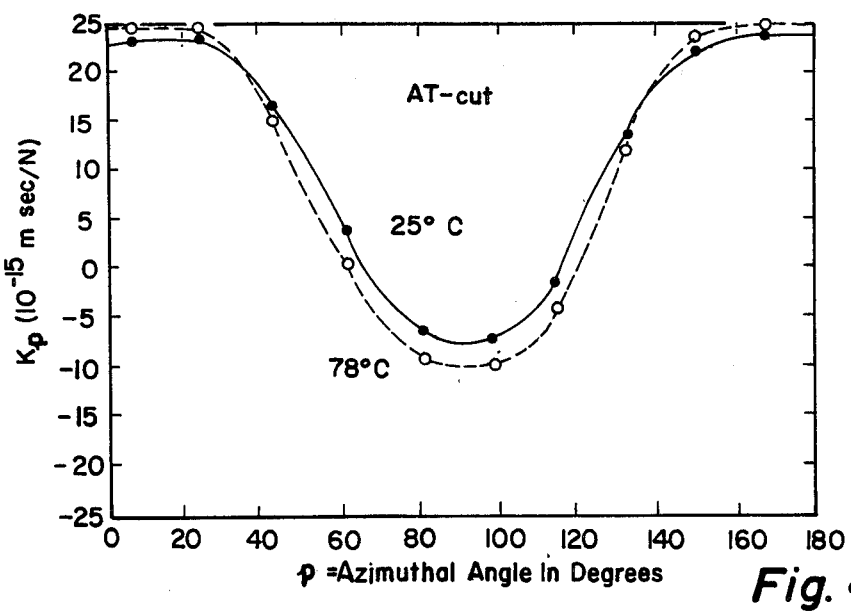
FIG. 4 is a graph showing the frequency shift coefficient Kp of an AT-cut crystal for a diametrically opposed force pair vs. the azimuthal angle p between the force pair and the crystallographic axis X.

FIG. 4 shows the coefficient (scale factor) $K_p$ for the AT-cut when an opposing force pair F acts at angle p measured from the crystallographic X axis of quartz (the force pair F is acting in the x axis direction of the resonator section). The coefficient is used in the equation $$df/f_o = K_p N_o F/(dt) \qquad (12)$$

where N is the frequency constant for the particular crystallographic cut of quartz (1660 m.Hz for the AT-cut).

As before indicated, for a circular housing a stress $T_{oo}$ acts around the edge of the disc. A $k_{oo}$ coefficient can be derived for the circular case by integrating the incremental force $T_{oo}$ trdp acting on an edge segment t thick and r dp wide where r is the radius of the resonator section, and where dp is an incremental change of the angle p, with the integration occurring from p=o to p=. Note that lower case k symbols will be used to relate frequency change to stress, while upper case K symbols will be used to relate frequency change to force or pressure, there being a $-1$ factor relating the two symbols because of the definitions of force and pressure compared to stress. The result is $$k_{oo} = -(N_o/2) \int_0^{\pi} K_p dp. \qquad (13)$$

The resulting change in frequency is:

$$df/f_o = k_{oo} T_{oo}.$$

For the AT-cut, $k_{oo} = -2.7 \times 10^{-11} m^2/N$. \qquad (14)

Then, $df/f_o$, for the combination of $T_{oo}$, $F_x$ and $F_z$ is found by superposition (in the case of a noncircular housing) to be:

$$df/f_o = T_{oo}\{k_{oo} - 2 \cdot \pi N_o(R-1)(K_p - K_{p+90°})/[16(R+1)]\}$$

Here p is the angle between the x direction of the noncircular housing and the quartz X axis.

It has been found that the interaction of the shell and the disc of the housing 4 of FIG. 1 causes a stress amplification C such that $$T_{oo} = -CP \qquad (16)$$

where P is pressure outside the shell. It has been found that certain experimental data fits best if C=2.4, which is close to a theoretical result of 2.6 calculated using finite element techniques, i.e., for the circular case, $$df/f_o = 0.44 \times 10^{-6} P = (2.7 \times 10^{-11})(6895 \text{ C P}) \qquad (17)$$

where C=2.4 and the "6895" changes units from $N/m^2$ to psi.

Referring again to FIG. 4, if the angle p=0, i.e., if the quartz X axis is the normal to the flats, $K_o$ and $K_{90}$ combine to obtain an increase over $k_{oo}$. Eq. 15 is rewritten to read $$df/f_o = K\,CP \tag{18}$$

where the scale factor K is $$K = -\{k_{oo} - 2\pi N_0(R-1)(K_p - K_{p+90°})/[16(R+1)]\}$$

Figure 5:
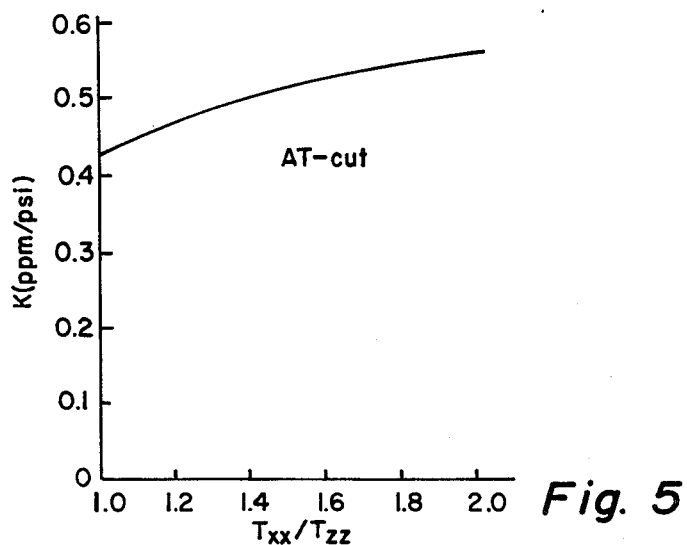
FIG. 5 is a graph showing the scale factor K for the structure of FIG. 1 vs. the ratio of stress $T_{xx}$ over stress $T_{zz}$.

K vs. R is shown in FIG. 5 for p=0. Experiments and finite element calculations show that R=1.5 can be obtained with the thinner wall thickness approximately ½ that of the thicker wall when the thickness of the resonator section is smaller than the thickness of the thinner wall, so the increase in K seen in FIG. 5 is possible.

Figure 6:
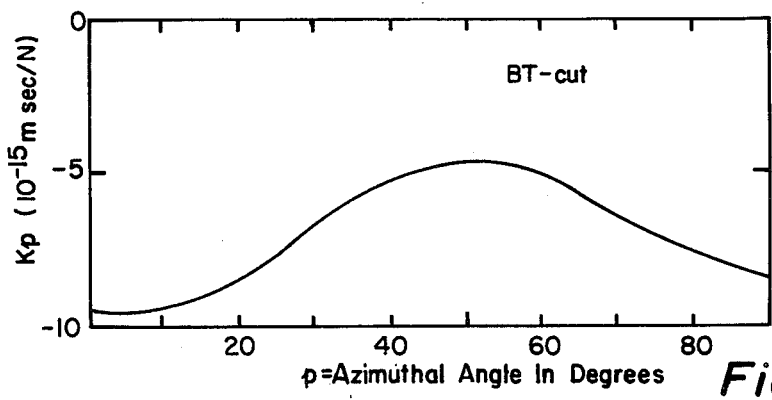
FIG. 6 is a graph showing the frequency shift coefficient Kp of a BT-cut crystal for a diametrically opposed force pair vs. the azimuthal angle between the force pair and the crystallographic axis X.

In contact, $K_p$ for the BT-cut is shown in FIG. 6. Note that $K_p$ is always negative, so selective placement of flats will not give rise to a significant increase, if any, of the scale factor.

In conclusion, it has been found that by appropriate placement of thinner wall sections, a significant increase in the scale factor K can be realized for the AT-cut crystal. Placement of the thinner wall sections at an angle p of between about −30° and +30° (equivalent to 150° to 210°) see FIG. 4—provides the desired increase in the scale factor.

Figure 7:
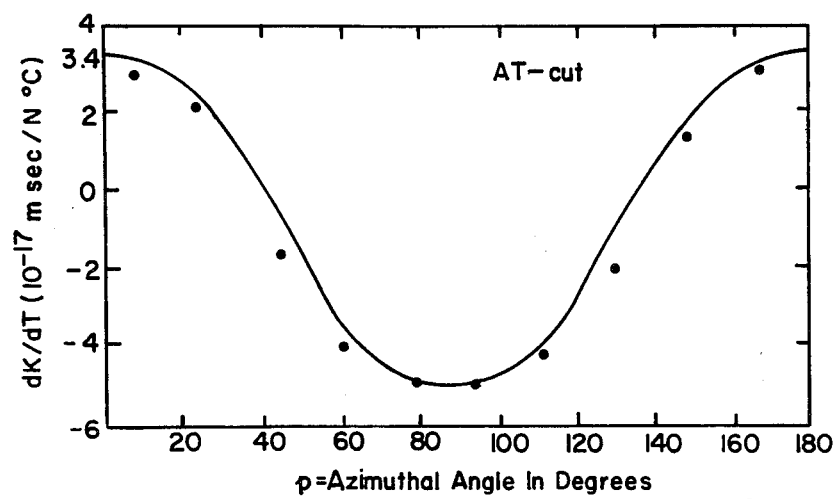
FIG. 7 is a graph showing the variation of the frequency shift coefficient of FIG. 4 with temperature vs. the azimuthal angle p.

Another factor of importance in using a pressure transducer over a wide temperature range is the temperature sensitivity of K. The BT-cut has a small $(1/K)(dK/dT)$ around room temperature, where T is temperature, but it becomes as large as −224 ppm/°C. at 125° C. and is increasing in magnitude rapidly above 125° C. Thus, for high temperature use, the BT-cut becomes more difficult to temperature compensate because of the increased temperature sensitivity of K. This effect is over and above the temperature effect problem shown in FIG. 3 for the BT-cut. The AT-cut has a large temperature sensitivity of K for a circular or symmetric, shape of −900 ppm/°C. for $(1/K)(dK/dT)$, or $(1/k_{oo})(dk_{oo}/dT)$, as measured experimentally. However, $(1/K)(dK/dT)$ for the AT-cut can be reduced with the nonsymmetric shape of FIG. 1. This comes about as follows. FIG. 7 shows $dK_p/dT$ for the AT-cut when squeezed by a diametrically opposed force pair. By taking the d/dT of Eq. 19 while assuming that R does not change with T and dividing by $-k_{oo}$, the following is obtained.

$$(1/K)(dK/dT) = (1/k_{oo})(dk_{oo}/dT)$$

$$2\pi N_0(R-1)(dK_p/dT - dK_{p+90°}/dT)/[16k_{oo}(R+1)].$$

$(1/k_{oo})(dK_{oo}/dT)$ is obtained from $$dk_{oo}/dT = -(N_0/2)\int_0^\pi (dK_p/dT)dp. \tag{21}$$

For the results in FIG. 7, $dk_{oo}/dT$ is found to be $2.7\times 10^{-14}$ m sec/N°C., and $(1/k_{oo})(dk_{oo}/dT)= -1000$ ppm/°C., which compares with −900 found experimentally.

Figure 8:
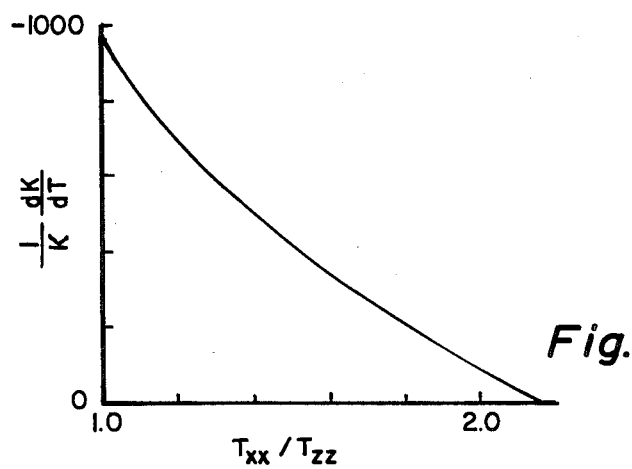
FIG. 8 is a graph showing how temperature affects the scale factor of FIG. 5 vs. the ratio of stress $T_{xx}$ over stress $T_{zz}$.

FIG. 8 shows Eq 20 vs R for when the quartz X axis is normal to the flats and illustrates that $(1/K)(dK/dT)$ can be reduced within experimentally achievable wall thickness ratios. This is possible because, for the AT-cut crystal, $dK_o/dT$ and $dK_{90}/dT$ combine as a positive addition to the normally negative $(1/k_{oo})(dk_{oo}/dT)$. This provides a significant advantage for the structure of FIG. 1 for the AT-cut. In particular, note in FIG. 7 that this advantage can occur for p between −30° and 30° where, again, p=−30° is equivalent to p=150° and p=30° is equivalent to p=210°.

It is important to understand that the scale factor coefficient K has been increased, thereby increasing sensitivity of the device, while the magnitude of $(1/K)(dK/dT)$ is reduced, all with the same set of thinner wall sections 22 and 24.

Figure 9:
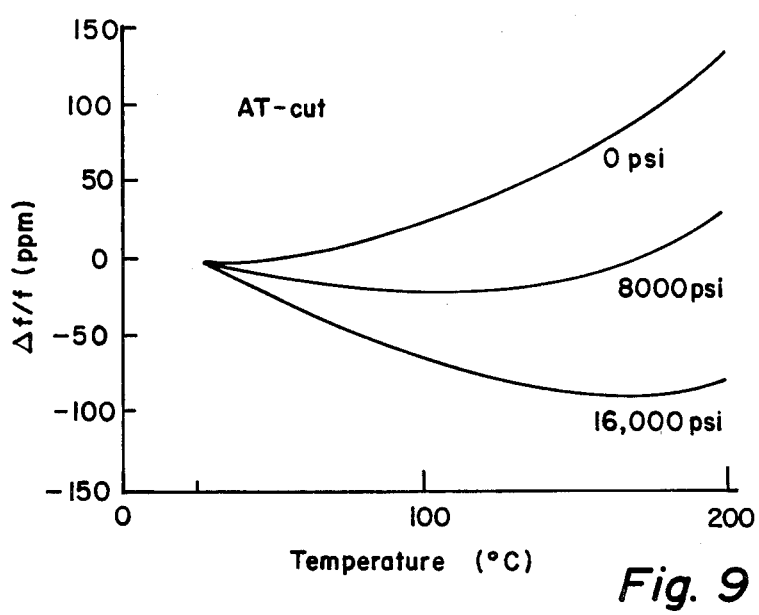
FIG. 9 is a graph showing frequency vs. temperature curves of the AT-cut resonator transducer of FIG. 1 for different pressures.

The frequency vs temperature characteristics shown in FIG. 3 display a turnover temperature $T_o$ where the slope is zero for both the BT-cut and the AT-cut. The curvature is upwards (positive) for the AT-cut and downwards (negative) for the BT-cut at the turnover. If the effect of the negative temperature sensitivity of the scale factor is superimposed with the effect of the frequency-temperature curves of FIG. 3, another significant feature of the At-cut becomes apparent, mainly that the turnover point moves up in temperature as the pressure increases. This is seen in FIG. 9. The rate at which the turning point moves up with pressure depends upon the choice of the thinner wall section thickness relative to the thicker wall section thickness and relative to the resonator section thickness, i.e., the $(1/k)(dK/dT)$, so the nonsymmetric shape of FIG. 1 can be used to obtain an optimum effect. Since one generally associates higher temperatures with higher pressures in oil and gas wells (deeper wells have higher temperature and higher pressure), the AT-cut is ideally suited for oil and gas well service. This is because the optimum operating point for minimal temperature effects is the turning point, and FIG. 9 shows that the AT-cut moves the turning point up as pressure goes up.

It should be noted that the curve in FIG. 9 for 0 psi can be adjusted by slight changes in the AT-cut crystallographic angle. Thus, a variety of curves similar to those in FIG. 9 can be generated.

In contrast to the AT-cut turning point, the BT-cut turning point moves down slightly with increasing pressure, making the device less desirable for oil and gas service.

In the manner described, a simple, easy-to-construct resonator pressure transducer is provided. The transducer includes a generally disc-shaped resonator section whose periphery is joined to and surrounded by a housing having sidewalls which extend generally normal to the plane of the resonator section. A selected portion or portions of the sidewalls are made thinner than the remaining portions of the sidewalls so that non-uniform stresses (generally radially directed) are created in the resonator section when the housing is immersed in a fluid whose pressure is to be measured.

It is to be understood that the above-described arrangements are only illustrative of the application of the principles of the present invention. Numerous modifications and alternative arrangements may be devised by those skilled in the art without departing from the spirit and scope of the invention, and the appended claims are intended to cover such modifications and arrangements.

What is claimed is:

1. A resonator pressure transducer comprising:
   a generally disc-shaped resonator section made of AT-cut crystalline quartz;

a housing surrounding the resonator section and joined to the perimeter thereof, said housing having sidewalls which extend generally normal to the plane of the resonator section, with two diametrically opposite portions of the sidewalls being thinner than the remaining portions of the sidewalls so that when the housing is immersed in a fluid, a non-uniform stress is produced in the resonator section;

means for causing said resonator section to vibrate, with the frequency of vibration varying with variation in pressure applied to the housing sidewalls; and wherein the diametric alignment of the thinner wall portions lies at an angle of about $-30$ to $+30$ degrees from the crystallographic axis X os the quartz.

2. A resonator pressure transducer comprising:

a generally disc-shaped resonator section made of AT-cut crystalline quartz;

a housing surrounding the resonator section and joined to the perimeter thereof, said housing having sidewalls which extend generally normal to the plane of the resonator section, with selected portions of the sidewalls being thinner than the remaining portions of the sidewalls so that when the housing is immersed in a fluid, a non-uniform stress is produced in the resonator section;

means for causing said resonator section to vibrate, with the frequency of vibration varying with variation in pressure applied to the housing sidewalls; and wherein the thinner wall portions are about three-fourths to one-half the thickness of the remaining wall portions, and the resonator section thickness is less than the thickness of the thinner wall portions.

3. Pressure detection apparatus comprising:

a generally disc-shaped AT-cut quartz crystal resonator section adapted to vibrate in response to an oscillatory signal, with the frequency of vibration varying with variation in force applied to the perimeter of the resonator section;

a housing having sidewalls joined to the perimeter of the resonator section to circumscribe the section and extend in opposite directions normal to the plane of the resonator section, wherein two portions of the sidewalls are thinner than the remaining portions and comprise diametrically opposite sidewalls, means for supplying an oscillatory signal to said resonator section to cause the section to vibrate; and wherein the alignment of the diametrically opposite sidewalls is rotated from the X crystallographic axis of the quartz by an angle of about $-30$ to $+30$ degrees.

4. Apparatus as in claim 3 wherein the thinner wall portions of the housing are about three-fourths to one-half the thickness of the remaining portions, and the resonator section thickness is less than the thickness of the thinner wall portions.

* * * * *

UNITED STATES PATENT AND TRADEMARK OFFICE
CERTIFICATE OF CORRECTION

PATENT NO. : 4,660,420
DATED : Apr. 28, 1987
INVENTOR(S) : Errol P. EerNisse

It is certified that error appears in the above-identified patent and that said Letters Patent is hereby corrected as shown below:

Correct ordinate designation of the graph of FIG. 7 to read:

$$dK_p/dT \ (10^{-17}{}_m \ sec/N°C)$$

Column 6, line 37, retype equation to read:

$$k_{oo} = - (N_o/2) \int_o^\pi K_p dp. \qquad (13)$$

Column 7, line 51, retype first line of equation to read:

$$(1/K)(dK/dT) = (1/k_{oo})(dk_{oo}/dT) -$$

Column 7, line 58, retype equation to read:

$$dk_{oo}/dT = -(N_o/2) \int_o^\pi (dK_p/dT)dp. \qquad (21)$$

Column 9, line 16, delete "os" and insert --of--.

Signed and Sealed this

Twenty-seventh Day of October, 1987

Attest:

DONALD J. QUIGG

Attesting Officer

Commissioner of Patents and Trademarks